United States Patent
Zylberberg et al.

(10) Patent No.: US 10,096,141 B2
(45) Date of Patent: Oct. 9, 2018

(54) SET AND METHOD FOR ASSISTING IN THE SHOOTING OF IMAGES OF OBJECTS PRESENTED ON A MOBILE REMOVABLE SUPPORT

(71) Applicant: ALLURE SYSTEMS, Paris (FR)

(72) Inventors: Raphael Zylberberg, Chamalieres (FR); Gabrielle Sentilhes Chou, Versailles (FR)

(73) Assignee: ALLURE SYSTEMS, Paris (FR)

( * ) Notice: Subject to any disclaimer, the term of this patent is extended or adjusted under 35 U.S.C. 154(b) by 163 days.

(21) Appl. No.: 15/502,894

(22) PCT Filed: Dec. 18, 2014

(86) PCT No.: PCT/FR2014/053424
§ 371 (c)(1),
(2) Date: Feb. 9, 2017

(87) PCT Pub. No.: WO2015/092296
PCT Pub. Date: Jun. 25, 2015

(65) Prior Publication Data
US 2017/0228911 A1    Aug. 10, 2017

(30) Foreign Application Priority Data
Dec. 20, 2013   (FR) ..................................... 13 63292

(51) Int. Cl.
*H04N 5/232* (2006.01)
*G06T 11/60* (2006.01)
(Continued)

(52) U.S. Cl.
CPC ........... *G06T 11/60* (2013.01); *F16M 11/041* (2013.01); *F16M 11/22* (2013.01); *F16M 11/42* (2013.01);
(Continued)

(58) Field of Classification Search
CPC .......... G06T 11/60; G06T 7/74; H04N 5/232; F16M 11/041; F16M 11/22; F16M 11/42; G06K 9/46
See application file for complete search history.

(56) References Cited

U.S. PATENT DOCUMENTS 4,885,844 A * 12/1989 Chun ..................... A41H 1/02
                                                        223/68
9,696,130 B1 * 7/2017 Eakins ..................... G01B 5/02
(Continued)

FOREIGN PATENT DOCUMENTS

| DE | 10 2011 051417 A1 | 1/2013 |
| GB | 2 464 742 A | 4/2010 |

OTHER PUBLICATIONS

International Search Report, dated Apr. 23, 2015, from corresponding PCT application.

*Primary Examiner* — Albert Cutler
(74) *Attorney, Agent, or Firm* — Young & Thompson (57) ABSTRACT

Disclosed is a set for assisting in the shooting of images of an object including a mobile removable support (120) configured to receive the object, a unit (135) for modifying the pose of a member, including a unit for rigid fastening by suspension of the support, making it possible to modify the pose of the support, image shooting unit (110) enabling images to be obtained representing the support and the object placed on the support as well as computing unit (115) for receiving images from the image shooting unit, analyzing the images received and, in response to an analysis of those images and predetermined position information, controlling the unit for modifying the pose of a member.

20 Claims, 6 Drawing Sheets

(51) Int. Cl.
*F16M 11/04* (2006.01)
*G06K 9/46* (2006.01)
*F16M 11/22* (2006.01)
*F16M 11/42* (2006.01)
*G06T 7/73* (2017.01)

(52) U.S. Cl.
CPC .................. *G06K 9/46* (2013.01); *G06T 7/74* (2017.01); *H04N 5/232* (2013.01)

(56) References Cited

U.S. PATENT DOCUMENTS

| | | | |
|---|---|---|---|
| 2002/0050988 A1* | 5/2002 | Petrov | G06K 9/20 345/418 |
| 2002/0105529 A1* | 8/2002 | Bowser | G06F 3/04815 345/629 |
| 2003/0038801 A1* | 2/2003 | Terauchi | G06T 1/0007 345/420 |
| 2005/0041096 A1* | 2/2005 | Horita | H04N 13/0221 348/42 |
| 2005/0154487 A1 | 7/2005 | Wang | |
| 2008/0262944 A1 | 10/2008 | Wu | |
| 2011/0227354 A1* | 9/2011 | Singh | A62B 99/00 294/81.2 |
| 2013/0258045 A1* | 10/2013 | Wojciech | H04N 5/23238 348/36 |
| 2013/0329014 A1* | 12/2013 | Obata | H04M 1/72522 348/46 |

* cited by examiner

SET AND METHOD FOR ASSISTING IN THE SHOOTING OF IMAGES OF OBJECTS PRESENTED ON A MOBILE REMOVABLE SUPPORT

FIELD OF THE INVENTION

The present invention concerns the photographic shooting of images of objects and more particularly a set and a method for assisting in the shooting of images of objects presented on mobile removable supports, making it possible in particular to precisely control the position of the photographed objects and to pass rapidly from the image shooting of one object to that of another object.

CONTEXT OF THE INVENTION

Constituting a catalog for presenting objects, for example clothes sales catalogs, requires a number of photographic images to be shot that is generally high. Conventionally, mannequins get dressed, images are shot, the mannequins change dress, other images are shot and so forth until all the shots of images all the clothes have been taken. The photographs are then processed then their page layout in a catalog is carried out.

Although enabling the required result to be obtained in terms of photographic quality, the cost of this method is particularly high on account of the time necessary for shooting the images, the use of mannequins and the manual processing of the photographs.

To mitigate this drawback, methods exist whereby clothes are placed on mobile supports, typically artificial mannequins, in order to be photographed. Processing of these photographs is then carried out to extract from its environment the part of the image representing the photographed item of clothing. In a following step, the extracted image part, representing the item of clothing, is superposed on a photograph of a mannequin to "dress" him or her.

It is noted here that the pose of the mannequin and the pose of the artificial mannequin wearing the item of clothing must be identical or at the very least similar to enable the superposition. The image resulting from the superposition of the image of a mannequin and the image of an item of clothing may then be used in identical manner to a photograph of a mannequin wearing the item of clothing.

Furthermore, the support for the objects to photograph may be controlled by a computer so as to control the pose thereof (i.e. position and orientation) and thus automate part of the chain of shooting images, that is to say, therefore, to reduce the image shooting time and thus the associated costs.

However, although such a method may enable sales catalogs for clothing to be produced for media such as the Internet, the quality and realism are not generally sufficient when the photomontages are automatic or too costly when they are manual for printed catalogs or on-line catalogs which need to reflect a certain quality for the products presented. Furthermore, the manipulation of the artificial mannequins slows the method and adds handling costs.

There is thus a need to improve the methods of shooting images of objects presented on a support.

SUMMARY OF THE INVENTION

The invention enables at least one of the problems set forth above to be solved.

The invention is thus directed to a set for assisting in the shooting of images of an object, this set comprising:

a mobile removable support configured to receive said object;

means for modifying the pose of a member, comprising means for rigid fastening by suspension of said support, said means for modifying the pose of a member being configured to modify the pose of said support when said support is fastened to said means for modifying the pose of a member;

image shooting means configured to enable at least one image to be obtained representing at least part of said support when said support is fastened to said means for modifying the pose of a member and at least part of an object placed on said support when said support is fastened to said means for modifying the pose of a member; and computing means for receiving at least one image from said image shooting means, analyzing at least one received image and, in response to an analysis of at least one received image and predetermined position information, controlling said means for modifying the pose of a member.

The invention thus makes it possible to provide a precise position of a mobile removable support, enabling time to be saved between the taking of different objects, when that support is put in place and removed repeatedly. The invention can in particular be used for the creation of composite photographs.

According to a particular embodiment, said support comprises at least one visual positioning element which is rigidly fastened to said support. The invention thus makes it possible to facilitate, the case arising, the adjustment of the pose of the support.

Still according to a particular embodiment, said support comprises a projecting part placed on the upper part of said support, said projecting part being configured to cooperate with one end of a transmission shaft linked to said means for modifying the pose of a member in order to fasten said support to said means for modifying the pose of a member.

Still according to a particular embodiment, said projecting part comprises at least one protuberance configured to cooperate with at least one open slot of said end of said transmission shaft to hold said support in suspended disposition. The invention thus enables easy putting in place and removal of the support while enabling the support to have a precise position.

Still according to a particular embodiment, the set further comprises a locking member to rigidly keep said projecting part against said end of said transmission shaft.

Still according to a particular embodiment, the set further comprises stiffening means cooperating with part of said transmission shaft to constrain the movement of said transmission shaft to at least one predetermined movement.

Still according to a particular embodiment, the set further comprises manipulation means for said support, said manipulation means enabling said support to be coupled and uncoupled from said means for modifying the pose of a member without porterage of said support.

The invention is also directed to a method of assisting in the shooting of images of an object using a set for assisting in the shooting of images of an object as described above, this method comprising the following steps:

fastening a mobile removable support on which is placed said object to said means for modifying the pose of a member of said set;

obtaining at least one image comprising at least part of said object and at least part of said support; and estimating the pose of said at least one object according to said at least one obtained image.

The invention thus makes it possible to provide a precise position of a mobile removable support, enabling time to be saved between the shooting of different objects, when that support is put in place and removed repeatedly.

According to a particular embodiment, the method further comprises a step of sending a command for modifying the pose of said support according to said estimated pose and a predetermined position. The invention thus enables the pose of the support to be precisely adjusted.

Still according to a particular embodiment, the method further comprises a step of storing in memory said at least one obtained image.

Moreover, according to a particular embodiment, the method further comprises an initial step of obtaining at least one reference image comprising at least part of said support, the pose of said support in said reference image being identical to that of said support in said at least one image comprising at least part of said object and at least part of said support, and a step of extracting a representation of said object from said at least one image comprising at least part of said object and at least part of said support. The invention thus enables automation of the creation of composite photographs capable in particular of being used in catalogs.

Still according to a particular embodiment, the method further comprises a step of analyzing said extracted representation of said object to distinguish the representation of said object from shadows of said object on said support.

Still according to a particular embodiment, the method further comprises a step of merging said extracted representation of said object in a photograph comprising a representation of a support of which the pose is identical to that of said support in said at least one image comprising at least part of said object and at least part of said support.

The present invention also relates to a computer program comprising instructions adapted for the implementation of each of the steps of the method described earlier when said program is executed on a computer. The advantages procured by that computer program are similar to those referred to above.

BRIEF PRESENTATION OF THE FIGURES

Other advantages, objects and features of the present invention will emerge from the following detailed description, given by way of non-limiting example, relative to the accompanying drawings in which:

FIG. 3, comprising

DETAILED DESCRIPTION OF EMBODIMENTS OF THE INVENTION

According to a particular embodiment, the device for assisting in the shooting of images comprises in particular a gantry enabling the suspension of a mobile removable support on which are presented the objects to photograph. The gantry here comprises actuators to modify, if required, the position of the support. These actuators may be controlled by a computer also able to control an image shooting device.

The mobile removable support is rigidly fastened to the actuators (or to the gantry in the absence of any actuator) such that its relative position cannot be modified. However, this mounting, providing a rigid link, is such that it enables easy fastening and removal of the support to enable the object to be photographed to be placed and removed easily while enabling the image shooting of another object on another support in the meantime.

The mobile removable support here comprises a visual positioning element, mounted and joined to the support, of which the pose may be determined by image analysis. For these purposes, the visual positioning element is identified in an image then compared to a digital model of that visual positioning element to deduce the pose therefrom. A pose computing algorithm, for example the algorithm known under the name Random Sample Consensus (RANSAC), may be used.

Thus, knowing the relative pose of this visual positioning element relative to that of the mobile removable support and knowing the pose of that visual positioning element in a frame of reference linked to the device used to obtain the image or the images from which the pose of that visual positioning element has been determined, it is possible to deduce therefrom the pose of the mobile removable support. It is thus possible, using the actuators and the visual positioning element to precisely adjust the pose of the mobile removable support in accordance with one or more predetermined poses.

The rigid link, by suspension, of the mobile removable support to the actuators of the gantry used makes it possible to limit any inadvertent movement of that support when shooting images and, therefore, to obtain photographs of an object placed on a support of which the position is precisely adjusted.

Figure 1:
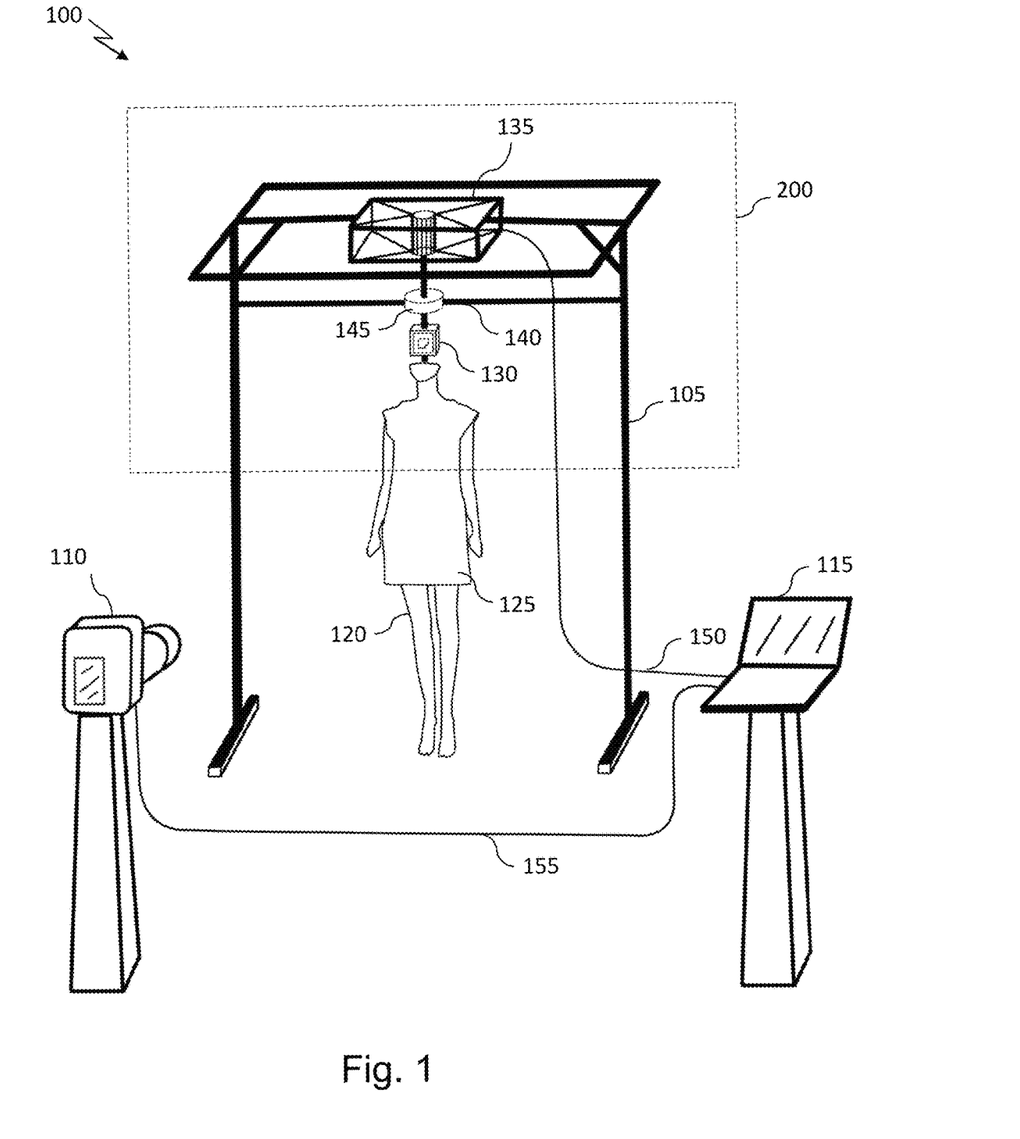
FIG. 1 is a diagram of an example of implementation of a particular embodiment of the invention.

FIG. 1 is a diagram of an example embodiment of a particular embodiment of the invention.

As illustrated, the image shooting environment 100 comprises a gantry 105, an image shooting device 110 such as a still camera or a video camera, a computer 115 and a mobile removable support 120 mounted on the gantry 105. The object to be photographed, here a dress 125, is placed on the mobile removable support 120. The latter here is a mannequin made from resin.

The mobile removable support 120, comprising a visual positioning element 130, is fastened here to the gantry 105 via an actuator 135 which may in particular be an electric motor 135, typically a stepper motor, able to be controlled by the computer 115, as illustrated. As described with reference to FIG. 3, the mobile removable support 120 is fastened here to the actuator 135 using at least one rigid lockable fastening device (not shown). The actuator 135 makes it possible to modify the pose of the mobile removable support 120.

According to the embodiment illustrated in FIG. 1, the rigid lockable fastening device is situated at the end of a transmission shaft linked directly or indirectly, for example via reduction gearing, to the motor 135. The position of this transmission shaft is advantageously constrained using stiffeners or supports, for example the support 140, here a support provided with a ball bearing 145 within which the transmission shaft passes.

The computer 115 enables the motor 135 to be controlled, for example using a wired connection 150 or using a wireless connection, for example a connection in accordance with the WiFi or Bluetooth standards (WiFi and Bluetooth are trademarks). Similarly, the computer 115 makes it possible to control the image shooting device 110 using a wired connection 155 or wireless connection such as a connection in accordance with the WiFi or Bluetooth standard.

The computer 115 may be remote from the motor 135 and from the image shooting device 110 and linked to them via a communication network such as the Internet.

Preferably, the connection between the computer 115 and the image shooting device 110 furthermore enables the computer 115 to receive images obtained by the image shooting device 110. These images may in particular be used to constitute a catalog and/or to control the pose of the mobile removable support 120.

Figure 2:
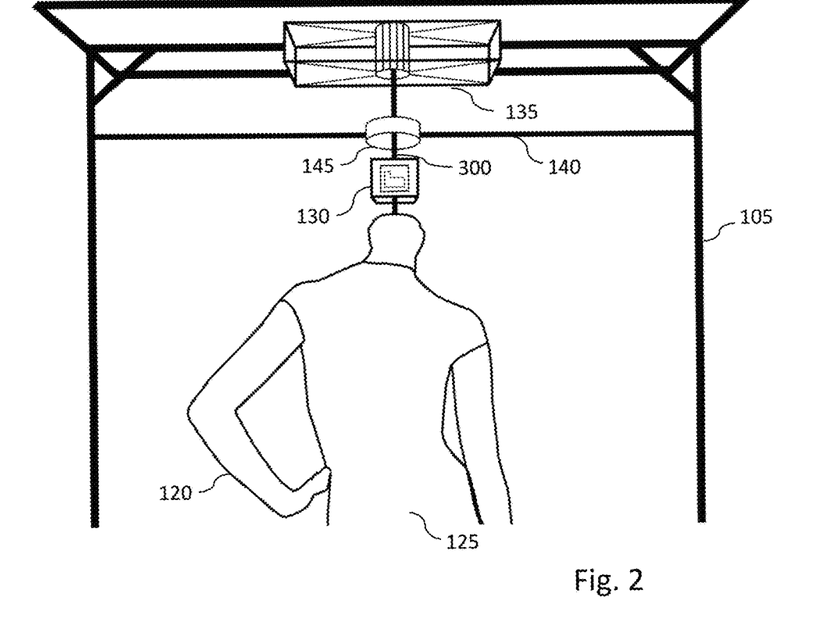
FIG. 2 represents the upper part of the gantry illustrated in FIG. 1, to which is fastened a mobile removable support on which is installed an object to photograph.

FIG. 2 represents the upper part of the gantry illustrated in FIG. 1, referenced 200, to which is fastened the mobile removable support 120 on which is installed the object to photograph.

According to a particular embodiment, the visual positioning element 130 is a cube of which the lateral faces are provided with geometric figures that are different (or differently oriented) enabling the position of the cube to be determined precisely (and incidentally the position of the mobile removable support).

Figure 3A:
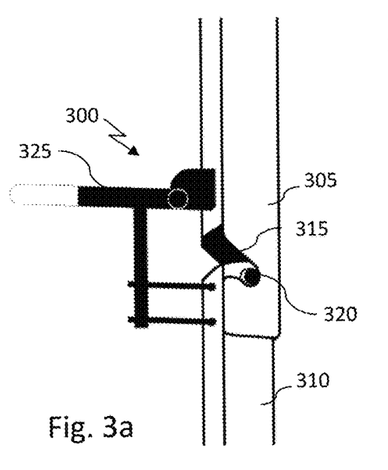
FIGS. 3a and 3b, illustrates two examples of lockable fastening devices for rigidly suspending a mobile removable support to a gantry or to a member of an actuator fastened to that gantry.
Figure 3B:
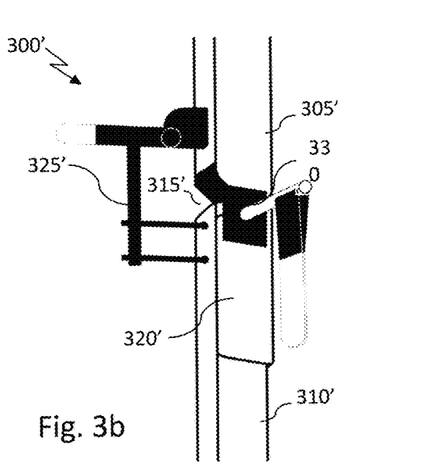

FIG. 3, comprising FIGS. 3*a* and 3*b*, illustrates two examples of lockable fastening devices 300 and 300' for rigidly suspending a mobile removable support to a gantry or to a member of an actuator fastened to that gantry.

According to the example illustrated in FIG. 3*a*, the mobile removable support is removably suspended from a tubular transmission shaft 305 which is linked, directly or indirectly, to an actuator. For these purposes, the mobile removable support here comprises, in its upper part, a rod (or tube) 310 of which the cross-section has the same shape as that of the transmission shaft 305 and of which the outside dimension substantially corresponds to the inside dimension of the transmission shaft 305 (here, tubular) such that the rod 310 and the transmission shaft 305 fit together with insertion of one into the other. Naturally, an opposite mounting (in which the inside dimension of the rod 310, here tubular, would substantially correspond to the outside dimension of the transmission shaft 305) could be implemented.

The cross-section of the transmission shaft is here of square shape to avoid movement by rotation around the axis of that shaft. Other shapes may be used.

It is open here on one side to facilitate the insertion fitting with the rod 310 and comprises, on two opposite sides, an open slot 315 configured to cooperate with lugs 320 (or more generally with protuberances) of the rod 310 to block the latter, as illustrated, in order to hold the mobile removable support in suspended disposition.

Furthermore, a fastening or clamping member 325, for example of clamp type, is advantageously used to lock the mounting of the rod 310 and the transmission shaft 305. As illustrated in FIG. 3*a* the fastening or clamping member 325 may be fastened to the transmission shaft 305 and, in a closed position, come to press the rod 310 against the wall of the transmission shaft 305.

The cooperation of the transmission shaft 305 and of the rod 310 using the slots 315 and lugs 320 enables precise positioning of the mobile removable support comprising the rod 310 relative to the transmission shaft 305. The fastening or clamping member 325 enables later modification of that position to be avoided.

Such a mounting enables easy manipulation of a mobile removable support which may thus be put in place and removed easily while enabling a predetermined position to be precisely recovered.

Similarly, the mobile removable support illustrated in FIG. 3*b* is removably suspended from a tubular transmission shaft 305' which is linked, directly or indirectly, to an actuator. Again, the mobile removable support here comprises, in its upper part, a rod (or tube) 310' of which the cross-section has the same shape as that of the tubular transmission shaft 305' and of which the outside dimension substantially corresponds to the inside dimension of the tubular transmission shaft 305' such that the rod 310' and the tubular transmission shaft 305' fit together with insertion of one into the other. Here too, reverse mounting may be employed.

The cross-section of the transmission shaft is here of square shape to avoid movement by rotation around the axis of that shaft. Other shapes may be used.

It is also open here on one side to facilitate the insertion fitting with the rod 310' and comprises, on two opposite sides, an open slot configured to cooperate with lugs (or more generally with protuberances) of the rod 310', not visible, to block the latter, as illustrated in FIG. 3*a*, in order to hold the mobile removable support in suspended disposition.

Furthermore, server fastening or clamping members are used to lock the mounting of the rod 310' and of the transmission shaft 305'. As illustrated in FIG. 3*b*, a first fastening or clamping member 325' is fastened here to the transmission shaft 305' and, in a closed position, comes to press the rod 310' against the wall of the transmission shaft 305'. A second fastening or clamping member 330 is here also fastened to the transmission shaft 305' and, in a closed position, comes to apply pressure on the lugs (or protuberances) of the rod 310', at the location where they slide in the slots formed in the transmission shaft 305'.

The use of these two fastening members makes it possible to substantially reduce, or even eliminate, the possible play between the transmission shaft 305' and the rod 310' on account of the pressure applied laterally by the second fastening member and of the pressure applied from the front by the first fastening member The cooperation of the transmission shaft 305' and of the rod 310' using the slots 315' and lugs 320' enables precise positioning of the mobile removable support comprising the rod 310' relative to the transmission shaft 305'. The fastening or clamping members 325' and 320 enable later modification of that position to be avoided.

Again, such a mounting enables easy manipulation of a mobile removable support which may thus be put in place and removed easily while enabling a predetermined position to be precisely recovered.

According to a particular embodiment, a manipulation dolly enables the movement of the mobile removable support in order to facilitate its putting in place and removal from the gantry 105.

Figure 4:
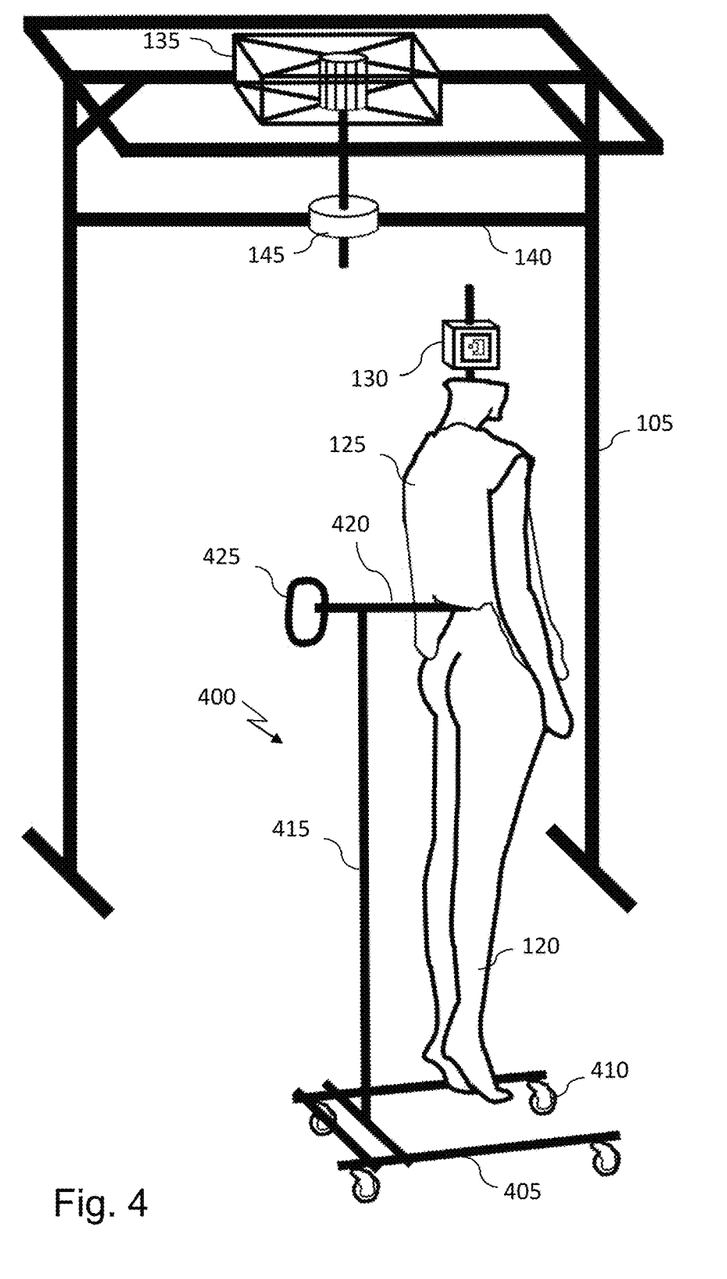
FIG. 4 illustrates an example of a manipulation dolly enabling the putting in place and removal of mobile removable supports of a gantry used for shooting images of objects placed on such supports.

FIG. 4 illustrates an example of a manipulation dolly 400 enabling the putting in place and removal of mobile removable supports of a gantry used for shooting images of objects placed on such supports.

As illustrated, the manipulation dolly 400 comprises a base structure 405 providing its stability. This base structure 405 here comprises wheels, for example four wheels, enabling its movement without particular effort. In other embodiments, a different number of wheels, for example two or three, is used.

The manipulation dolly 400 further comprises a vertical structure 415 on which is mounted a coupling member 420, which is substantially horizontal, enabling the fastening of a mobile removable support 120. According to a particular configuration embodiment, the coupling member 420 basically consists of a horizontal rod configured to cooperate with a coupling point for example consisting of a cavity of the mobile removable support 120 (placed above the center of gravity and in such a way as to ensure the stability of that support when it is placed on the manipulation dolly 400).

Still according to a particular embodiment, the manipulation dolly 400 comprises a mechanism for vertical movement of the coupling member 420 conferring at least two positions on the latter, a resting position and a position for putting in place and removal. In the resting position, the coupling member 420 is situated substantially at the same height as the coupling point of the mobile removable support 120 when the latter is fastened to the gantry 105. In the position for putting in place and removal, the coupling member 420 is situated at a height such that, when the mobile removable support is fastened to that coupling member, the lugs 320 of the rod 310 can engage in the slots 315 or disengage therefrom.

The manipulation dolly 400 further comprises, in the illustrated example, a handle 425 to facilitate its handling.

Figure 5:
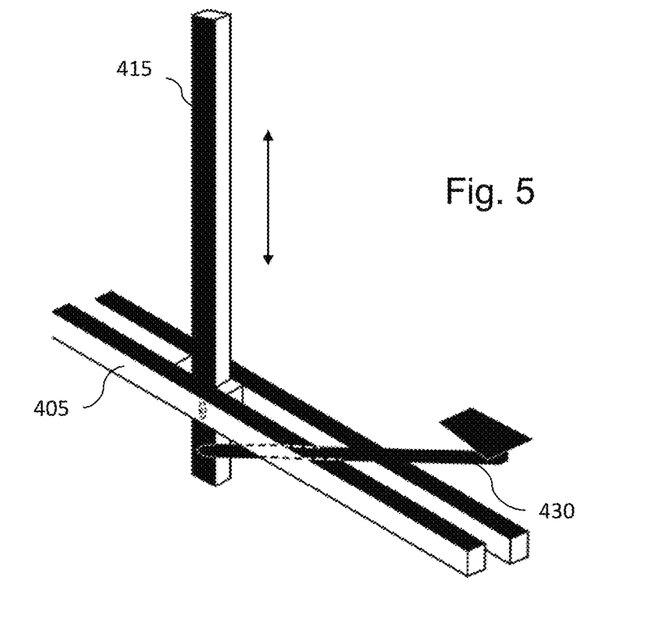
FIG. 5 illustrates an example of a mechanism for vertical movement of a coupling member of a manipulation dolly such as that illustrated in FIG. 4.

FIG. 5 illustrates an example of a mechanism for vertical movement of a coupling member of a manipulation dolly such as that illustrated in FIG. 4.

As illustrated, the base structure 405 here comprises a substantially vertical cavity in which the vertical structure 415 can vertically slide. This latter is linked to a lever 430 of which the lever shaft is joined to the base structure 405. Thus, when an operator presses on the lever 430, for example with his foot, the vertical structure 415 is driven upwards with the coupling member 420, enabling the lugs 320 to be engaged with or disengaged from the slots 315.

Figure 6:
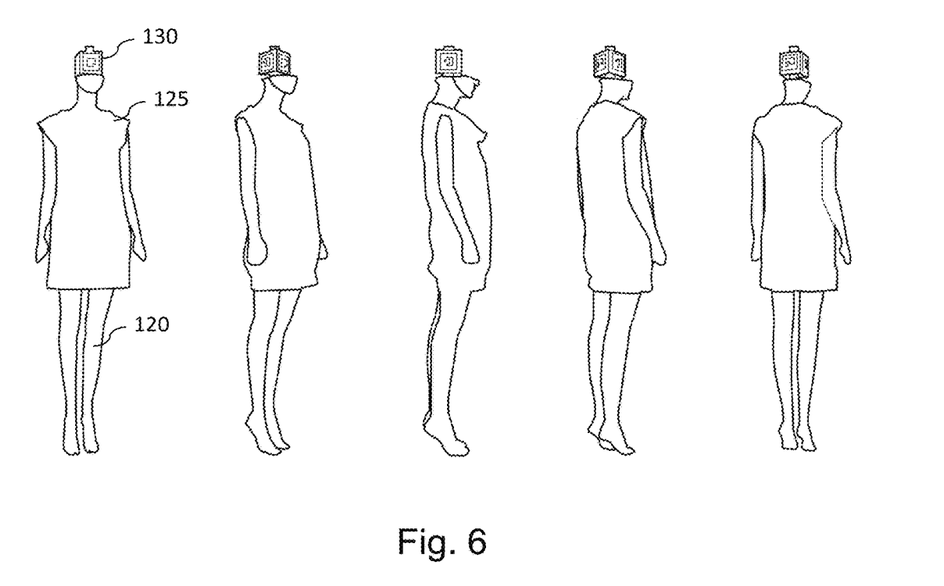
FIG. 6 represents an example of a mobile removable support on which is placed an object to photograph, in several positions.

FIG. 6 represents an example of a mobile removable support on which is placed an object to photograph in several positions.

These positions are controlled here by the computer 115 according to predetermined angles based on the analysis of the representation of the visual positioning element 130, firmly attached to the mobile removable support, in images acquired via the device 110.

Figure 7:
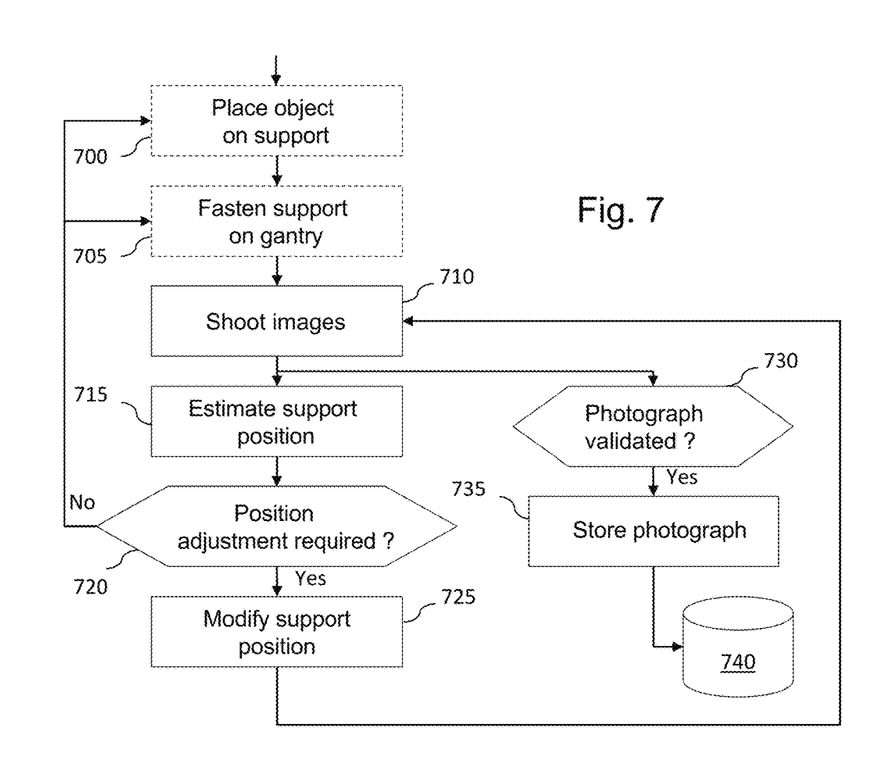
FIG. 7 illustrates certain steps of an image shooting method implementing an embodiment of the invention.

FIG. 7 illustrates certain steps of an image shooting method implementing an embodiment of the invention.

As illustrated, a first step (step 700) consists of putting in place an object to photograph on a mobile removable support. The support is next fastened to the gantry, preferably via one or more actuators, using fastening means enabling a rigid connection to be made as described above (step 705). These steps are typically carried out by an operator, as suggested by the use of dashed line.

In a following step, image shooting is carried out (step 710). The acquired image is then analyzed to determine the pose of the support based on that of a visual positioning element of which the acquired image comprises a representation (step 715). A test is next carried out to determine whether the position of the support (step 720) should be adjusted.

By way of illustration, the position of the support should be adjusted if the position does not precisely match a predefined position or if a shooting of a new image of the same object is to be carried out with a different pose.

In the affirmative, a new position is estimated and a corresponding command is sent to one or more actuators to modify the position of the support accordingly (step 725). A new image is then acquired and the steps described earlier are repeated (steps 710 and those following).

In the opposite case, if it is not necessary to modify the position, a new object is put in place on a mobile removable support and/or a mobile removable support on which is placed an object to photograph is fastened to the gantry via one or more actuators (steps 700 and/or 705). Alternatively, the method is made to terminate if no new image shooting is necessary.

After having shot an image (step 710), a test is carried out (step 730) to determine whether the photograph made should be kept or not, for example to use it later for the creation of a catalog. In the affirmative, the photograph is stored (step 735), for example in a database 740. A test may also be carried out so as to store the photograph only if the pose of the mobile removable support is in conformity with a predetermined pose.

It is observed here that, according to a particular embodiment, the photograph taken may be processed before being stored, for example to extract an item of clothing installed on the mobile removable support. It is also possible to store the original photograph and the processed photograph.

Still According to a particular embodiment, several photographs may be taken for a given pose while, for example, varying the lighting.

Figure 8:
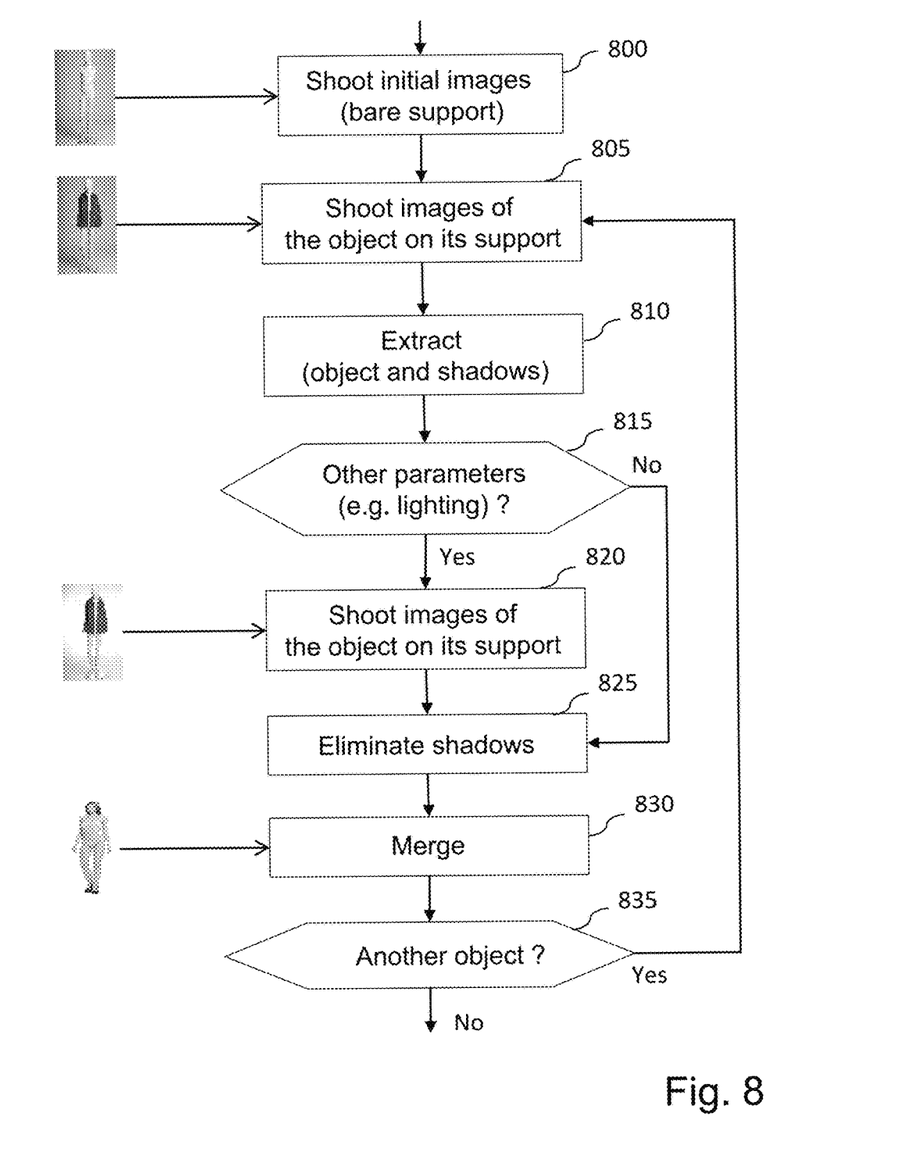
FIG. 8 illustrates certain steps of a method of processing images to extract a representation of an object photographed on a first mobile removable support, for example an item of clothing photographed on an artificial mannequin, and to insert that representation into an image representing a second support, for example an image of a real mannequin.

FIG. 8 illustrates certain steps of a method of processing images to extract a representation of an object photographed on a first mobile removable support, for example an item of clothing photographed on an artificial mannequin, and to insert that representation into an image representing a second support, for example a photograph of a real mannequin.

A first step (here 800) is directed here to shooting one or more initial images of the mobile removable support alone (i.e. without the object to photograph) in one or more predetermined poses, that is to say reference images of the mobile removable support. These shots of images are made under standard conditions (in particular lighting conditions), that is to say conditions in which objects ought to be photographed later.

The pose or poses of the mobile removable support are advantageously adjusted by using a visual positioning element rigidly associated with the mobile removable support and an algorithm such as that described with reference to FIG. 7 (without placing the object on the support).

The step of shooting initial images may belong to a calibrating step. It is carried out periodically, for example at the start of each cycle of image shooting, or when the conditions for image shooting change.

In a following step (step 805), one or more images are shot of the object placed on the mobile removable support for one or more predetermined poses corresponding to all or some of the poses used for the image or images shot of the mobile removable support alone (step 800). The conditions for shooting images, in particular the lighting conditions, are identical here (or very close) to those used for the images shot of the mobile removable support alone.

Again, the pose or poses of the mobile removable support on which is placed the object to photograph are advantageously adjusted by using a visual positioning element rigidly associated with the mobile removable support and an algorithm such as that described with reference to FIG. 7.

The photographed object is next extracted (step 810) by comparison of two photographs, one of the mobile removable support alone, the other of the mobile removable support on which is placed the object, matching the same pose. This extraction, typically made by subtraction pixel by pixel, enables the photographed object and its shadow to be obtained, with neither support nor background element.

A test is next carried out (step 815) to determine whether other images of the object should be shot under other conditions, in particular of lighting. Such image shooting may be necessary, in a later step, to enable the object to be distinguished from its shadows, according to the algorithm used.

New images are shot if necessary (step 820). Once again, the pose or poses of the mobile removable support on which is placed the object to photograph are advantageously adjusted by using a visual positioning element rigidly associated with the mobile removable support and an algorithm such as that described with reference to FIG. 7.

In a following step, the image resulting from the comparison of two photographs, one of the mobile removable support alone, the other of the mobile removable support on which has been placed the object, corresponding to a same pose, is analyzed to enable the object to be differentiated from its shadow (step 825).

For these purposes, different algorithms may be used.

According to an algorithm known under the name Color Normalized Cross Correlation, described, for example, in the paper entitled "*A color similarity measure for robust shadow removal in real-time*", Grest et al., VMV 2003, the color and its intensity are used to compute the shadows. For these purposes, a photograph of the mobile removable support without the object which created the shadows, for example an artificial mannequin without any item of clothing, and a photograph of the mobile removable support on which has been placed the object, taken in the same pose and in the same conditions, in particular of lighting, are used. The shadows on the mobile removable support are the regions in which the color is exactly the same in both photographs but with different intensities.

According to another algorithm, described, for example, in the paper entitled "*Shadow removal via flash/noflash illumination*", Lu et al., the detection of the shadows is carried out using two photographs of the object on its support, one taken with a powerful flash and the other without. The photograph with the powerful flash exaggerates the shadows which become easier to detect.

Other algorithms may be used.

When the object and its shadows have been extracted, they may be added (step 830) onto a photograph representing another support, for example a real mannequin of which the pose is identical to that of the mobile removable support, used to extract the object and its shadows. This merging is typically carried out by replacing the pixels of the photograph representing the other support by those of the object and by combining the pixels of the photograph representing the other support with those of the shadows (that is to say by applying a transparency coefficient to the shadows).

A test is then carried out to determine whether other objects should be photographed and/or processed. In the affirmative, steps 805 to 830 are repeated.

It is observed here that the steps 810, 825 and 830 may be implemented on the basis of photographs taken beforehand and received from a storage memory (for example a database).

Figure 9:
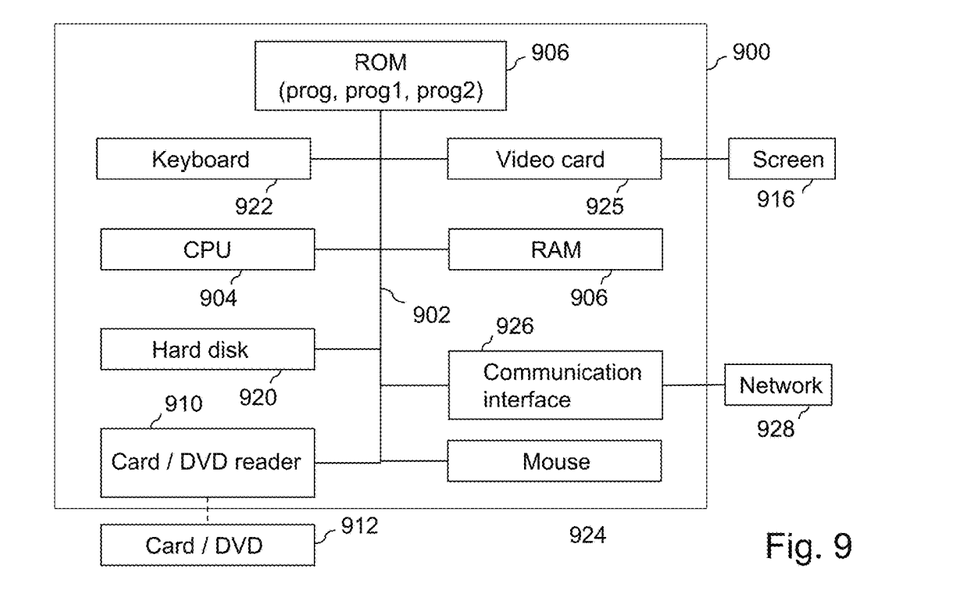
FIG. 9 illustrates an example of an information processing device configured to implement an embodiment at least partially.

FIG. 9 illustrates an example of a device able to be used to at least partially implement an embodiment, in particular of the steps described with reference to FIGS. 7 and 8. The device 900 is for example a computer 115 illustrated in FIG. 1.

The device 900 preferably comprises a communication bus 902 to which are connected:
- a central processing unit (CPU) or microprocessor 904;
- A read only memory 906 (ROM) able to include the operating system and programs such as "Frog";
- a Random Access Memory (RAM) or cache memory 908, comprising registers adapted to record variables and parameters created and modified during the execution of the aforementioned programs;
- a reader 910 of a removable storage medium 912 such as a memory card or a disc, for example a DVD disc; and
- a graphics card 914 linked to a screen 916.

Optionally, the device 900 may also have the following elements:
- a hard disk 920 able to contain the aforesaid programs "Prog" and data processed or to be processed according to the invention;
- a keyboard 922 and a mouse 924 or any other pointing device such as an optical stylus, a touch screen or a remote control enabling the user to interact with the programs according to the invention, in particular to select positions of the mobile removable support on which is disposed an object to photograph and to take photographs; and
- a communication interface 926 connected to a distributed communication network 928, for example the Internet network, the interface being able to transmit and receive data.

The communication bus allows communication and interoperability between the different elements included in the device 900 or connected to it. The representation of the bus is non-limiting and, in particular, the central processing unit may communicate instructions to any element of the device 900 directly or by means of another element of the device 900.

The executable code of each program enabling the programmable apparatus to implement the processes according to the invention may be stored, for example, on the hard disk 920 or in read only memory 906.

According to a variant, the executable code of the programs can be received by the intermediary of the communication network 928, via the interface 926, in order to be stored in an identical fashion to that described previously.

More generally, the program or programs may be loaded into one of the storage means of the device 900 before being executed.

The central processing unit 904 will control and direct the execution of the instructions or portions of software code of the program or programs according to the invention, these instructions being stored on the hard disk 920 or in the read-only memory 906 or in the other aforementioned storage elements. On powering up, the program or programs which are stored in a non-volatile memory, for example the hard disk 920 or the read only memory 906, are transferred into the random-access memory 908, which then contains the executable code of the program or programs according to the invention, as well as registers for storing the variables and parameters necessary for implementation of the invention.

Naturally, to satisfy specific needs, a person competent in the field of the invention will be able to apply modifications to the preceding description. The present invention is not limited to the described embodiments, other variants and combinations of features are possible.

The present invention has been described and illustrated in the present detailed description with reference to the appended Figures. However, the present invention is not limited to the embodiments presented. Other variants and embodiments may be deduced and implemented by the person competent in the field of the invention on reading the present description and appended Figures.

In the claims, the term "comprise" does not exclude other elements or other steps. The indefinite article "a" does not exclude the plural. A single processor or several other units may be used to implement the invention. The different features presented and/or claimed may advantageously be combined. Their presence in the description or in different dependent claims, does not indeed exclude the possibility of combining them. The reference signs are not to be understood as limiting the scope of the invention.

The invention claimed is:

1. A set for assisting in the shooting of images of an object, said set comprising:
   a mobile removable support system configured to receive said object;
   an actuator configured to modify the pose of a member, comprising a lockable fastening device configured to fasten by suspension of said support system, said actuator being configured to modify the pose of said support system when said support system is fastened to said actuator;
   an image shooting device configured to enable at least one image to be obtained representing at least part of said support system when said support system is fastened to the actuator and at least part of an object placed on said support system when said support system is fastened to the actuator; and
   a computer configured to receive at least one image from said image shooting device, to analyze the at least one received image, and, in response to the analysis of the at least one received image and predetermined position information, controlling the actuator configured to modify the pose of a member.

2. The set according to claim 1, wherein said support system comprises at least one visual positioning element which is rigidly fastened to said support system.

3. The set according to claim 2, wherein said support system comprises a projecting part placed on the upper part of said support, said projecting part being configured to cooperate with one end of a transmission shaft linked to the actuator in order to fasten said support system to the actuator.

4. The set according to claim 2, further comprising a manipulation dolly for said support system, said manipulation dolly enabling said support system to be coupled and uncoupled from said actuator configured to modify the pose of a member without porterage of said support system.

5. The set according to claim 1, wherein said support system comprises a projecting part placed on the upper part of said support system, said projecting part being configured to cooperate with one end of a transmission shaft linked to the actuator in order to fasten said support system to the actuator.

6. The set according to claim 5, wherein said projecting part comprises at least one protuberance configured to cooperate with at least one open slot of said end of said transmission shaft to hold said support system in suspended disposition.

7. The set according to claim 6, further comprising a locking member configured to rigidly keep said projecting part against said end of said transmission shaft.

8. The set according to claim 6, further comprising stiffeners cooperating with part of said transmission shaft to constrain the movement of said transmission shaft to at least one predetermined movement.

9. The set according to claim 5, further comprising a locking member configured to rigidly keep said projecting part against said end of said transmission shaft.

10. The set according to claim 9, further comprising stiffeners cooperating with part of said transmission shaft to constrain the movement of said transmission shaft to at least one predetermined movement.

11. The set according to claim 5, further comprising stiffeners cooperating with part of said transmission shaft to constrain the movement of said transmission shaft to at least one predetermined movement.

12. The set according to claim 5, further comprising a manipulation dolly for said support system, said manipulation dolly enabling said support system to be coupled and uncoupled from said actuator configured to modify the pose of a member without porterage of said support system.

13. The set according to claim 1, further comprising a manipulation dolly for said support system, said manipulation dolly enabling said support system to be coupled and uncoupled from said actuator configured to modify the pose of a member without porterage of said support system.

14. A method of assisting in the shooting of images of an object using the set for assisting in the shooting of images of an object, according to claim 1, the method comprising:
   fastening a mobile removable support system on which is placed said object to said actuator configured to modify the pose of a member of said set;
   obtaining at least one image comprising at least part of said object and at least part of said support system; and
   estimating the pose of said at least one object according to said at least one obtained image.

15. The method according to claim 14, further comprising sending a command for modifying the pose of said support system according to said estimated pose and a predetermined position.

16. The method according to claim 14, further comprising storing said at least one obtained image.

17. The method according to claim 14, further comprising:
   obtaining at least one reference image comprising at least part of said support system prior to the fastening, the obtaining, and the estimating, the pose of said support system in said reference image being identical to the pose of said support system in said at least one image comprising at least part of said object and at least part of said support system; and extracting a representation of said object from said at least one image comprising at least part of said object and at least part of said support system.

18. The method according to claim 17, further comprising analyzing said extracted representation of said object to distinguish the representation of said object from shadows of said object on said support system.

19. The method according to claim 17, further comprising merging said extracted representation of said object in a photograph comprising a representation of a support system of which the pose is identical to the pose of said support system in said at least one image comprising at least part of said object and at least part of said support system.

20. A non-transitory computer readable medium comprising computer program instructions configured to carry out each of the steps of the method according to claim 14 when said program is executed on a computer.

* * * * *